United States Patent Office.

LAWRENCE FELLDIN, OF SAN FRANCISCO, CALIFORNIA.

FIRE-PROOF COMPOUND.

SPECIFICATION forming part of Letters Patent No. 291,176, dated January 1, 1884.

Application filed June 18, 1883. (No specimens.)

*To all whom it may concern:*

Be it known that I, LAWRENCE FELLDIN, a subject of the Emperor of Germany, and residing at San Francisco, in the county of San Francisco and State of California, have invented a new and useful composition of matter to be used as a Fire-Proof Compound, of which the following is a specification.

My composition consists of the following-named ingredients, combined in about the proportions stated, viz: asbestus, one pound; green vitriol, five pounds; sulphuric acid, one pint; sal-ammoniac, one-half pound; sulphur, one pound; silica, one-half pound; crude sulphuret of antimony, one pound. The asbestus, sulphur, silica, sal-ammoniac, and crude black antimony are first reduced to an impalpable powder, and are to be thoroughly incorporated together. The green vitriol or sulphate of iron is then reduced to a powder and dissolved in a sufficient quantity of water, and the sulphuric acid is added thereto. I then prepare a mixture of pulverized pipe or fire clay or Portland cement, to which a small quantity of slaked lime or plaster-of-paris has been added, and of about one hundred pounds of water, and mix the same in a tank or tub of suitable dimensions. The asbestus, green vitriol, sulphuric acid, sal-ammoniac, sulphur, silica, and antimony are then added to the pulverized fire-clay and water, and the whole is thoroughly mixed by stirring.

It should here be remarked that the pulverized clay, flint, or quartz is used in sufficient quantity to give the desired consistency or body to the compound and adapt it to be applied with a brush, after the manner of ordinary oil-paint, and also that pulverized soapstone may be used instead of the asbestus.

This fire-proof compound, when thin, may be applied with a paint-brush or with a whitewash-brush in the ordinary manner. When it is very thick, it may be applied with a plasterer's float. It is intended more particularly for use upon wooden walls and upon articles made of wood or other combustible material.

I am aware that asbestus and silica have been used heretofore as the ingredients of fire-proof compound; but I am not aware that all of the ingredients of my composition, in the proportions stated, have been used together.

Having thus described my invention, what I claim, and desire to secure by Letters Patent, is—

The herein-described composition of matter to be used as a fire-proof compound, and consisting of water, pulverized fire-clay, asbestus, green vitriol, sulphuric acid, sal-ammoniac, sulphur, silica, and crude sulphuret of antimony, in about the proportions specified.

In testimony that I claim the foregoing I have hereunto set my hand and seal.

LAWRENCE FELLDIN. [L. S.]

Witnesses:
 WILMER BRADFORD,
 JAMES L. KING.